(12) United States Patent
Chang et al.

(10) Patent No.: US 7,215,513 B1
(45) Date of Patent: May 8, 2007

(54) DISK DRIVE INCLUDING A ONE-PIECE STAMPED ACTUATOR ARM ASSEMBLY AND METHOD OF MAKING SAME

(75) Inventors: Ken L. Chang, Saratoga, CA (US); Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 357 days.

(21) Appl. No.: 10/633,190

(22) Filed: Jul. 31, 2003

(51) Int. Cl.
*G11B 5/54* (2006.01)

(52) U.S. Cl. .................................. 360/265.9
(58) Field of Classification Search ............. 360/265.9
See application file for complete search history.

(56) References Cited

U.S. PATENT DOCUMENTS

| | | | |
|---|---|---|---|
| 5,291,360 A | 3/1994 | Foote | |
| 5,717,549 A | 2/1998 | Jurgenson | |
| 5,966,269 A | 10/1999 | Marek et al. | |
| 6,229,677 B1 | 5/2001 | Hudson et al. | |
| 6,477,017 B2 | 11/2002 | Kohei et al. | |
| 6,563,676 B1 | 5/2003 | Chew et al. | |
| 6,636,383 B1 * | 10/2003 | Chew | 360/245.9 |
| 6,683,756 B1 | 1/2004 | Zhao et al. | 360/265.8 |
| 6,687,094 B2 | 2/2004 | Liu et al. | 260/265.7 |
| 6,728,072 B1 * | 4/2004 | Van Sloun et al. | 360/244.6 |
| 6,765,764 B1 | 7/2004 | Misso et al. | |
| 6,836,387 B2 * | 12/2004 | Ohba et al. | 360/97.01 |
| 6,982,853 B1 | 1/2006 | Oveyssi et al. | |
| 7,092,216 B1 | 8/2006 | Chang et al. | |
| 7,161,769 B1 | 1/2007 | Chang et al. | |
| 2002/0057536 A1 | 5/2002 | Boutaghou et al. | |
| 2002/0064000 A1 | 5/2002 | Liu et al. | |
| 2003/0030941 A1 | 2/2003 | Lau et al. | |
| 2003/0076633 A1 * | 4/2003 | Macpherson et al. | 360/265.7 |

* cited by examiner

*Primary Examiner*—William J Klimowicz
*Assistant Examiner*—Mark Blouin
(74) *Attorney, Agent, or Firm*—Young Law Firm

(57) ABSTRACT

An actuator arm assembly of a disk drive is stamped from a single flat sheet of material and includes first and second actuator arm portions and one or more bendable portions integrally joining the first and second actuator arm portions. A method of making an actuator arm assembly for a disk drive includes steps of providing a flat sheet of material and stamping an actuator arm assembly from the sheet such that the stamped actuator arm assembly includes first and second actuator arm portions and one or more bendable portions integrally joining the first and second actuator arm portions.

26 Claims, 6 Drawing Sheets

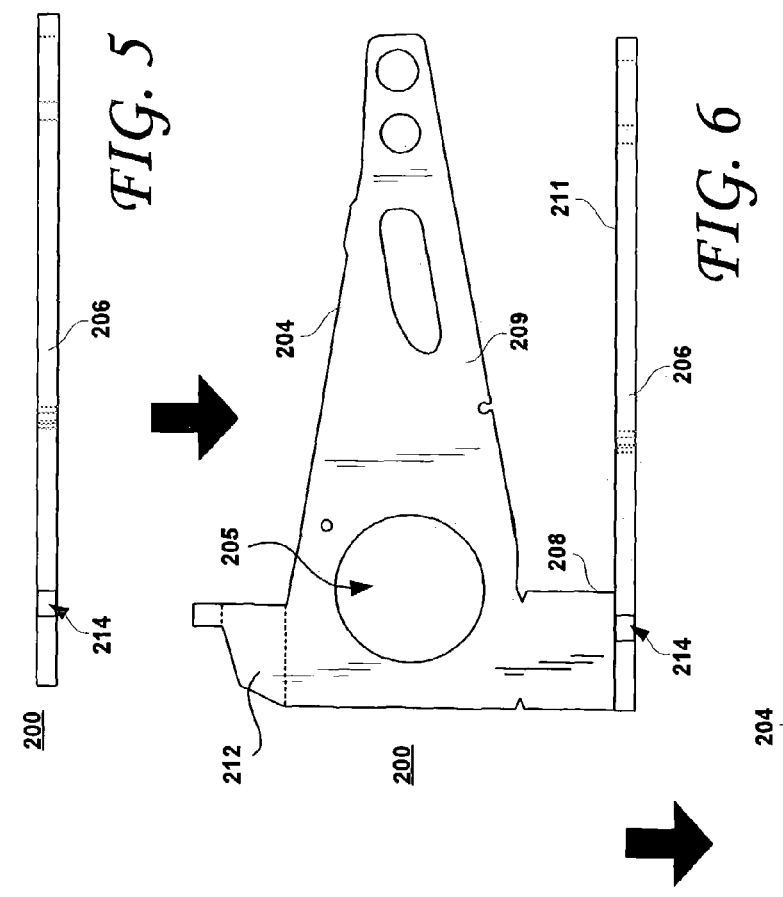
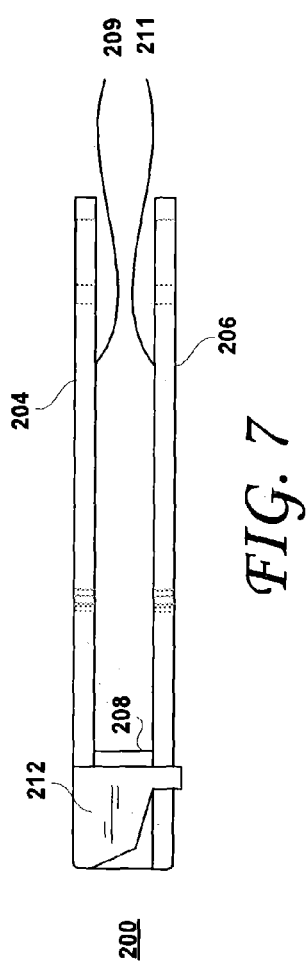
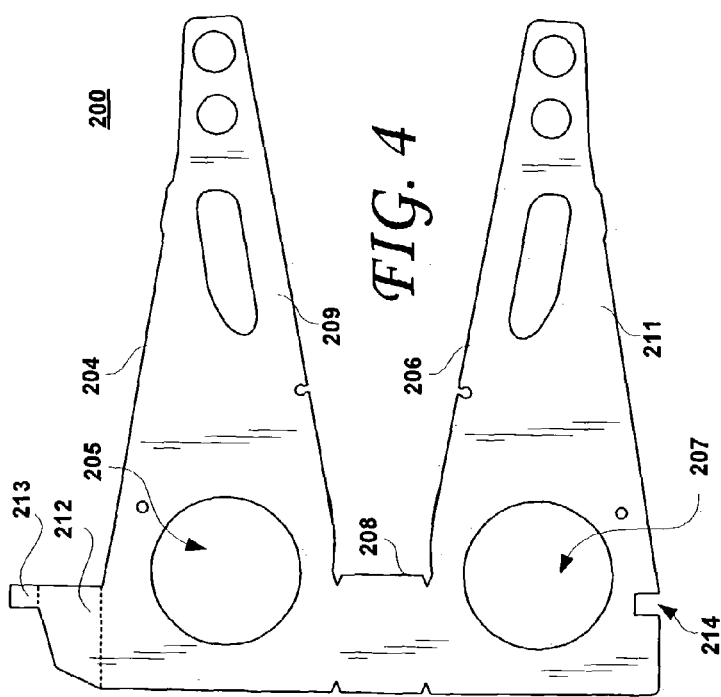

DISK DRIVE INCLUDING A ONE-PIECE STAMPED ACTUATOR ARM ASSEMBLY AND METHOD OF MAKING SAME

BACKGROUND OF THE INVENTION

1. Field of the Invention

The present invention relates to disk drives. More particularly, the present invention relates to actuator arm assemblies, constituent parts thereof and methods of making such actuator arm assemblies.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator arm assembly that moves in response to the servo control system; (2) a head gimbal assembly ("HGA") that extends from the actuator arm assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

FIG. 1A shows an exploded view of portions of a conventional actuator arm assembly that includes two stamped actuator arms. FIG. 1B shows the portions of the conventional actuator arm assembly of FIG. 1A, with the collar fitted to the two stamped actuator arms. Considering now FIGS. 1A and 1B collectively, the portions of the conventional actuator arm assembly shown include a first actuator arm 102 and a second actuator arm 104 and an actuator assembly collar 106. A chemical polishing step may be carried out to polish the surfaces of the actuator arms and to remove any unwanted artifacts of the stamping process. The collar 106 may then be fitted to both actuator arms, which stiffens the resultant actuator arm assembly. However, even though the separate and distinct actuator arms 104, 106 are mechanically coupled to one another by the collar 106, the structure nevertheless still suffers from unwanted resonance modes, which detrimentally affect the performance of the disk drive in which such a conventional actuator arm assembly is utilized.

From the foregoing, it may be appreciated that less costly and higher performing alternatives to conventional arm assemblies (an exemplar of which is shown in FIG. 1B) are desirable.

SUMMARY OF THE INVENTION

Accordingly an embodiment of the present invention may be regarded as an actuator arm assembly for a disk drive, the actuator arm assembly being stamped from a single flat sheet of material and including a first actuator arm portion defining a first latch portion; a second actuator arm portion defining a second latch portion configured to latch with the first latch portion, and an actuator arm-joining portion integrally joining the first actuator arm portion to the second actuator arm portion.

According to further embodiments, the actuator arm assembly may be configured to pivot about a pivot axis and the actuator arm-joining portion may be configured to bend into an orientation that is substantially parallel to the pivot axis. The actuator arm assembly may be configured to pivot about a pivot axis and the first latch portion may be configured to bend into an orientation that is substantially parallel to the pivot axis. The actuator arm assembly may be configured to pivot about a pivot axis and both the actuator arm-joining portion and the first latch portion may be configured to bend into orientations that are substantially parallel to the pivot axis. The first actuator arm portion may include a first surface defined by a thickness and a length of the first actuator arm portion and the second actuator arm portion may include a second surface defined by a thickness and a length of the second actuator arm portion and prior to bending, the first surface faces and is parallel to the second surface. The first actuator arm portion may define a first surface that defines a first through bore, the second actuator arm portion may define a second surface that defines a second through bore that is configured to align with the first through bore. The actuator arm-joining portion and the first latch portion may be configured to bend such that a major surface of the first actuator arm portion faces and is substantially parallel to a major surface of the second actuator arm portion.

According to another embodiment, the present invention may also be viewed as a head stack assembly for a disk drive. The head stack assembly may include an actuator arm assembly stamped from a single flat sheet of material and comprising: a first actuator arm portion defining a first latch portion; a second actuator arm portion defining a second latch portion configured to latch with the first latch portion, and an actuator arm-joining portion integrally joining the first actuator arm portion to the second actuator arm portion. A first head gimbal assembly may be coupled to the actuator arm assembly. A second head gimbal assembly may be coupled to the second actuator arm portion.

According to still another embodiment, the present invention is a disk drive. The disk drive may include a disk; a head stack assembly for reading and writing to the disk, and a first head gimbal assembly coupled to the actuator arm assembly. The head stack assembly may include an actuator arm assembly stamped from a single flat sheet of material and may include a first actuator arm portion defining a first latch portion; a second actuator arm portion defining a second latch portion configured to latch with the first latch portion, and an actuator arm-joining portion integrally joining the first actuator arm portion to the second actuator arm portion.

The actuator arm assembly may be configured to pivot about a pivot axis and the actuator arm-joining portion may be configured to bend into an orientation that is substantially parallel to the pivot axis. The actuator arm assembly may be configured to pivot about a pivot axis and the first latch portion may be configured to bend into an orientation that is substantially parallel to the pivot axis. The actuator arm assembly may be configured to pivot about a pivot axis and both the actuator arm-joining portion and the first latch portion may be configured to bend into orientations that are substantially parallel to the pivot axis. The first actuator arm portion may include a first surface defined by a thickness and a length of the first actuator arm portion and the second actuator arm portion may include a second surface defined by a thickness and a length of the second actuator arm portion and prior to bending, the first surface faces and is parallel to the second surface. The first actuator arm portion may define a first surface that defines a first through bore, the second actuator arm portion may define a second surface that defines a second through bore that is configured to align with the first through bore.

The present invention may also be regarded as a method of making an actuator arm assembly for a disk drive. According to an embodiment of the present invention, the method may include the steps of providing a flat sheet of material and stamping the actuator arm assembly from the provided sheet of material such that the stamped arm assembly includes a first actuator arm portion defining a first latch portion; a second actuator arm portion defining a second latch portion configured to latch with the first latch portion, and an actuator arm-joining portion integrally joining the first actuator arm portion to the second actuator arm portion.

According to further embodiments, a step of bending the actuator arm-joining portion may be carried out such that a major surface of the first actuator arm portion faces and is substantially parallel to a major surface of the second actuator arm portion. A step of bending the first latch portion may also be carried out such that the first latch portion latches with the second latch portion. The stamping step may create a first through bore in the first actuator arm portion and a second through bore in the second actuator arm portion. After the bending step, the first through bore is configured to align with the second through bore and the method further may include a step of fitting a collar within the first and second through bores to stiffen the actuator arm assembly.

The foregoing and other features of the invention are described in detail below and set forth in the appended claims.

BRIEF DESCRIPTION OF THE DRAWINGS

FIG. 4 shows a top view of a stamped actuator arm assembly according to an embodiment of the present invention, made according to the method of FIGS. 2–3.

FIG. 5 shows a side view of a stamped actuator arm assembly of FIG. 4.

FIG. 6 shows a side view of the stamped actuator arm assembly of FIG. 5 in a partially bent configuration.

FIG. 7 shows a side view of the stamped actuator arm assembly of FIG. 5 in its final configuration.

DESCRIPTION OF THE PREFERRED EMBODIMENTS

Figure 1A:
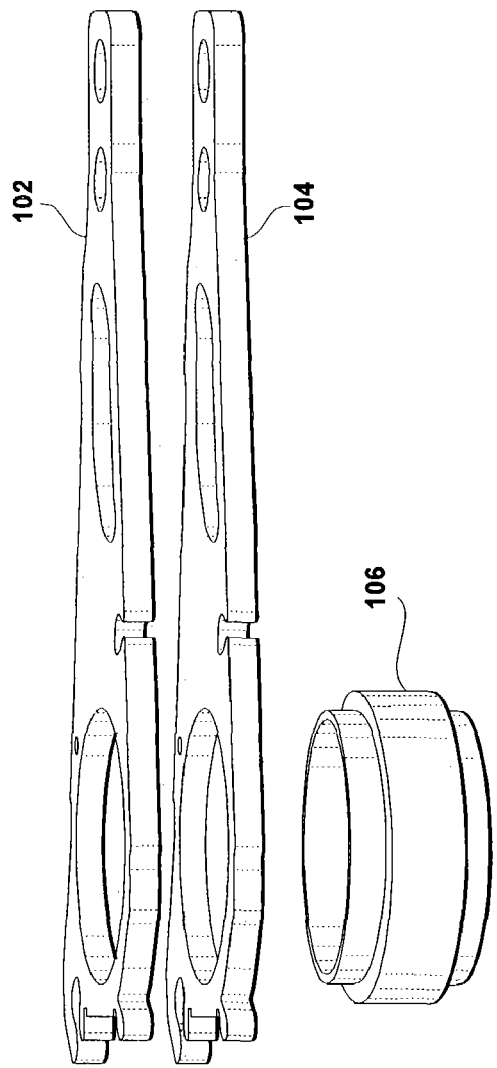
FIG. 1A shows an exploded view of portions of a conventional stamped actuator arm assembly that includes two separate and distinct actuator arms.
Figure 1B:
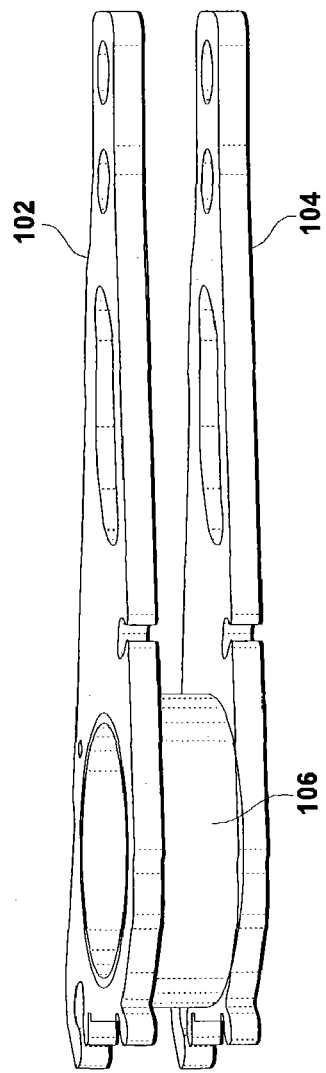
FIG. 1B shows the stamped actuator arm assembly of FIG. 1A, with the collar fitted to the two separate and distinct actuator arms.
Figure 2:
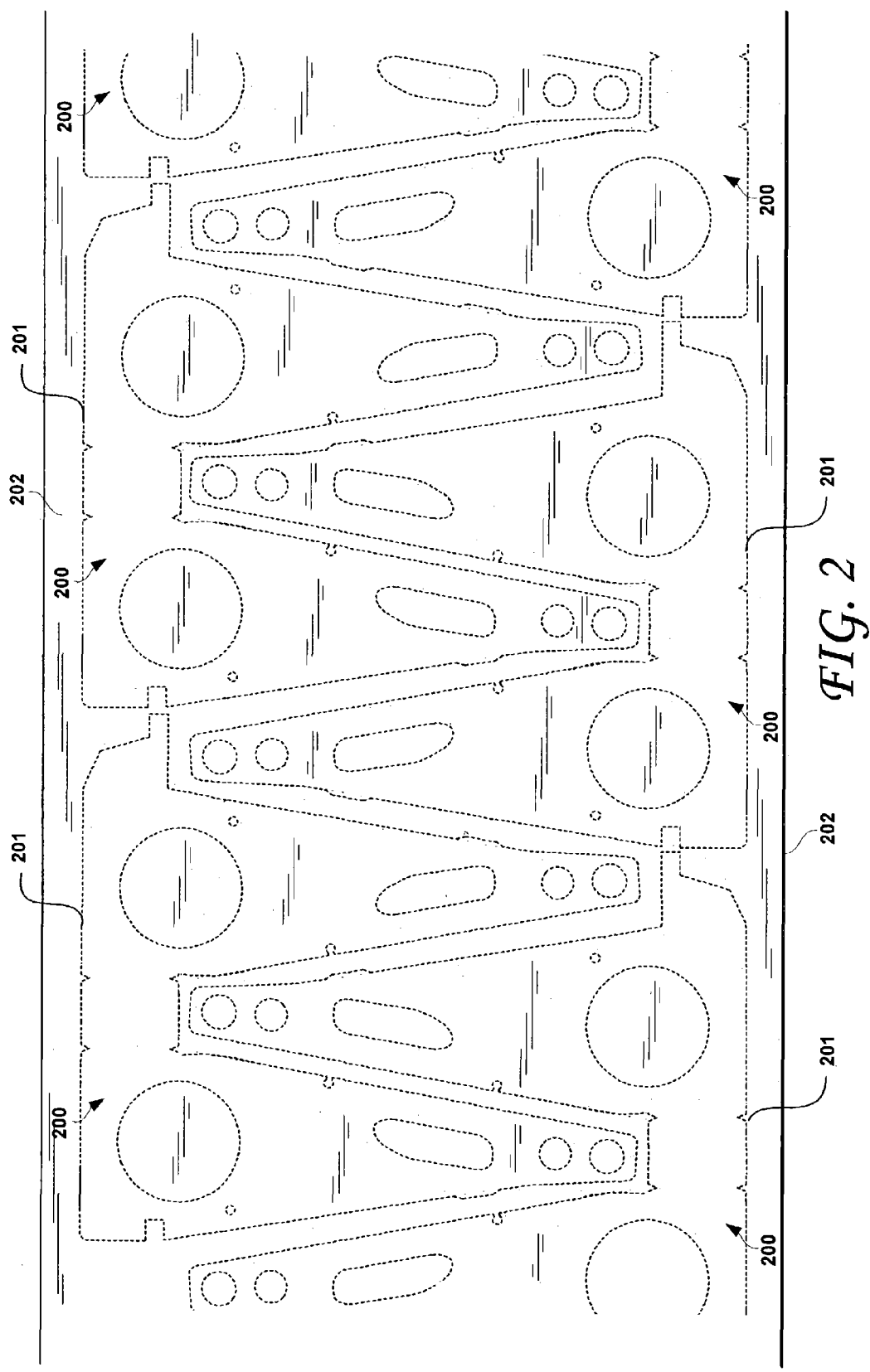
FIG. 2 shows aspects of the method of making a stamped actuator arm assembly, according to an embodiment of the present invention.
Figure 3:
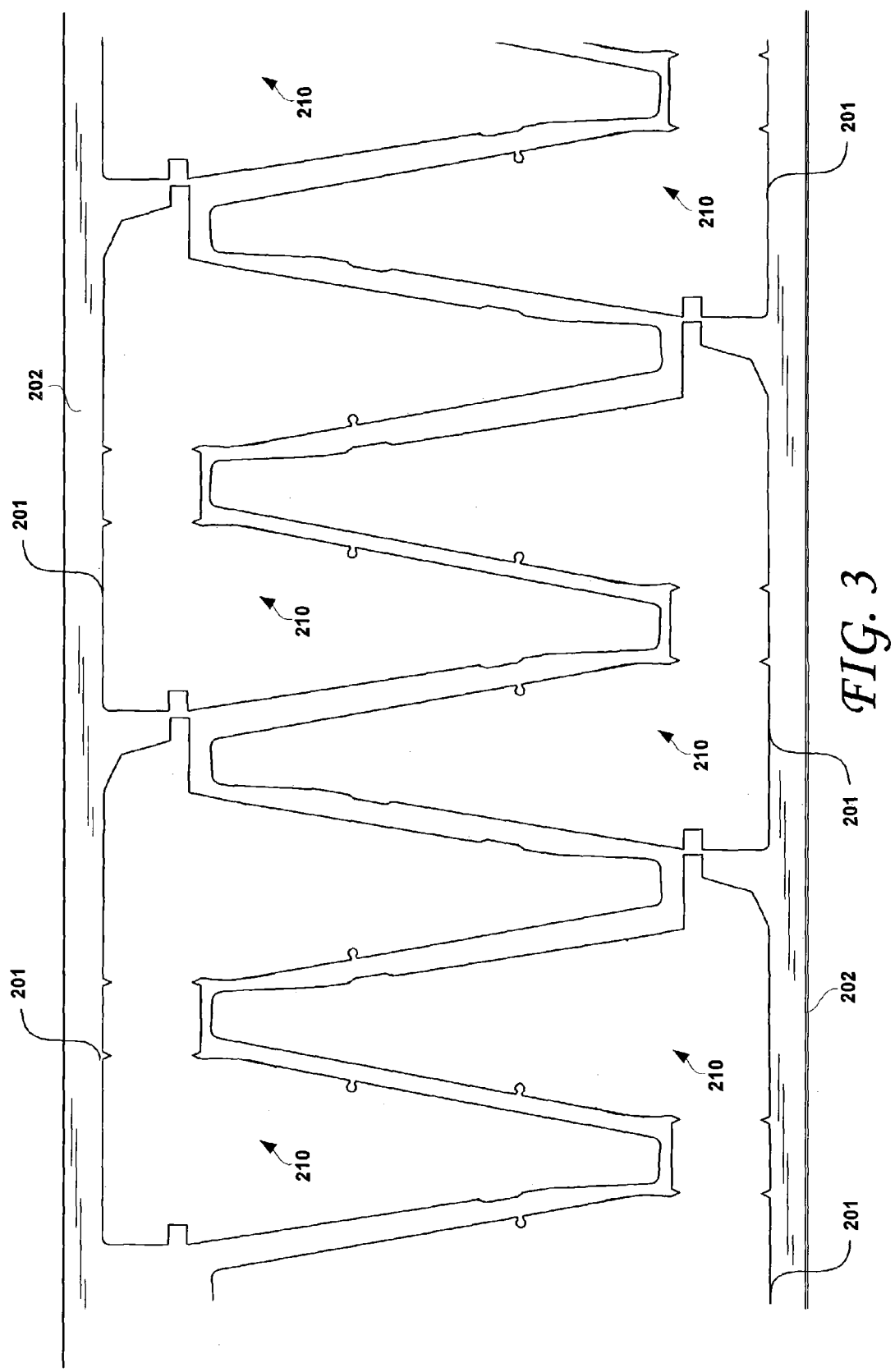
FIG. 3 shows further aspects of the method of making a stamped actuator arm assembly, according to an embodiment of the present invention.
Figure 9:
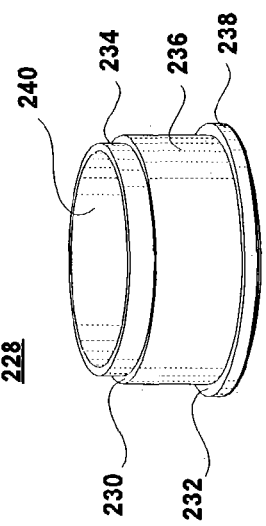
FIG. 9 shows a collar, such as may be fitted to the present stamped actuator arm assembly, according to an embodiment of the present invention.

Embodiments of the present invention call for both the actuator arms to be made together from a stamping process. FIGS. 2–4 show aspects of the method of making a stamped actuator arm assembly, according to an embodiment of the present invention. As shown, the actuator arm assembly 200 may be made by providing a flat sheet of material 202, such as a flat sheet of steel, for example. The embodiment of the present invention shown in FIGS. 2–3 shows the flat sheet of material 202 as being only sufficiently wide to accommodate a single file train of arm assemblies 200. However, the present invention is not limited to such sheets, as the sheet utilized may be dimensioned so as to allow several arm assemblies 200 to be formed side by side. In any event, in the embodiment shown in FIGS. 2–3, the sheet of material 202 is dimensioned so as to allow a plurality of arm assemblies 200 to be formed in a serial fashion, one next to and interdigitated with the other. FIG. 2 shows the outline 201 of the actuator arm assembly 200 that will be obtained from the stamping process according to the present invention. FIG. 3 shows a portion of the flat sheet of material 202 after the arm assemblies 200 have been stamped therefrom. As shown, after the arm assemblies 200 have been stamped from the sheet of material 202, the edges of the sheet 202 cut along the outline 201 by the stamping process define the shape of the resultant actuator arm assembly 200. After the stamping process, the sheet of material 202, therefore, defines voids 210 having the external outline of the actuator arm assembly 200. FIG. 4 shows the resultant actuator arm assembly 200 stamped from the sheet of material 202, after the stamping process, but before the actuator arm assembly is bent and made to assume its final configuration, according to an embodiment of the present invention. As shown, each actuator arm assembly 200 stamped from the sheet of material 202 includes a first actuator arm portion 204, a second actuator arm portion 206 and an actuator arm-joining portion 208 integrally joining the first actuator arm portion 204 to the second actuator arm portion 206. Therefore, the first actuator arm portion 204, the actuator arm-joining portion 208 and the second actuator arm portion 206 are cut out from the sheet of material 202 in one piece. FIGS. 2–4 show that, according to embodiments of the present invention, the actuator arm-joining portion 208 is integrally formed with the first and second actuator arm portions 204, 206, from the same sheet of material 202 and at the same time and by the same stamping process. The actuator arm-joining portion 208 joins the actuator arm portions 204, 206, which are arranged in a mirrored orientation relative to one another. The stamping process according to embodiments of the present invention may also form all of the required features of the actuator arm assembly 200 such as, for example, a first through bore 205 defined within the first actuator arm portion 204 and a second through bore 207 defined within the second actuator arm portion 206 and any other desired structural features. Also formed during the stamping process are a first latch portion 212 and a second latch portion 214. The first latch portion 212 may be formed as a projection from the first actuator arm portion 204 and may include an end tab 213. The second latch portion 214 may be formed as a notch or cutout formed within the second actuator arm portion 206 and is configured to latch with the first latch portion 212. The first and second latch portions 212, 214 may be configured differently than shown in figures, as the present invention is not limited to specific latch configurations. However latched, the joined arm-joining portion 208, first and second actuator arm portions 204, 206, the first latch portion 214 and the second latch portion 214 collectively form a rigid box shape.

FIG. 5 shows a side view of a stamped actuator arm assembly 200, according to an embodiment of the present invention. Only the edge of the second actuator arm portion 206 is visible in this view. As shown, the actuator arm assembly 200 is a flat assembly having the thickness of the sheet of material 202 from which it was stamped. The view of FIG. 6 shows the stamped actuator arm assembly 200 of FIGS. 4 and 5 after the arm-joining portion 208 is bent such that the major surface 209 of the first actuator arm portion 204 is substantially perpendicular to the major surface 211 of the second actuator arm portion 206. The actuator arm assembly 200 may then be bent as suggested by FIG. 7. That is, the actuator arm-joining portion 208 may be again bent such that the major surfaces 209, 211 of the first and second actuator arm portions 204, 206 are substantially parallel to one another. As shown in FIG. 7, the bending may occur notches defined within the first arm-joining portion 208, and the first and second actuator arm portions 204, 206 are maintained substantially straight and unbent. The arm-joining portion 208 may be shaped such that is bends uniformly along its entire length, or may be bend such that the majority of the bending occurs near the first and second actuator arm portions 204, 206. However the bending is accomplished, the end result is the actuator arm assembly 200 shown in FIG. 7, in which the major surfaces 209, 211 of the first and second actuator arm portions 204, 206 are parallel or substantially parallel to one another, with arm-joining portion 208 generally perpendicular to such major surfaces 209, 211 and integrally joining the first and second actuator arm portions 204, 206. To achieve the configuration shown in FIG. 7, the first latch portion 212 may be bent such that its end tab 213 fits within the notch of the second latch portion 214. Various means for ensuring the latching (and the optional locking, if desired) of the first and second latch portions 212, 214, such as interference fits, lip surfaces, detents and the like may be devised within the context of the present invention.

Figure 8:
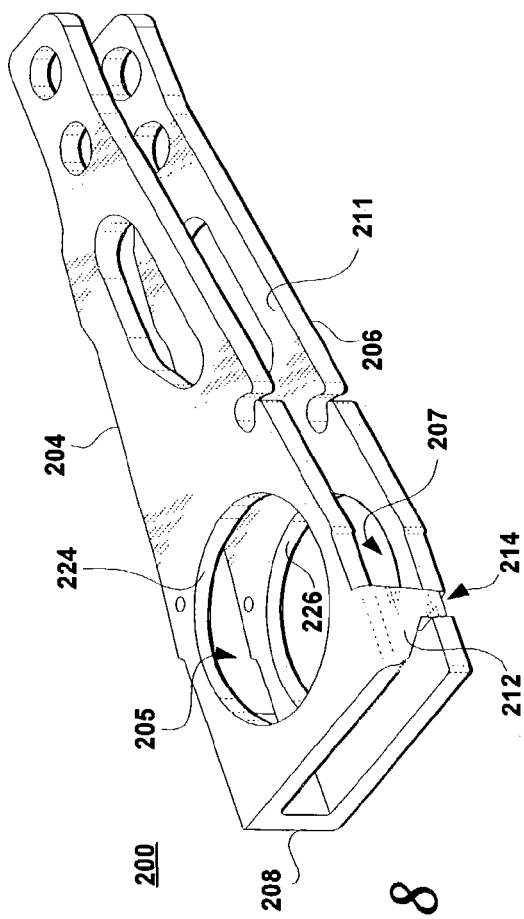
FIG. 8 is a side perspective view of a stamped actuator arm assembly according to an embodiment of the present invention.

FIG. 8 is a side perspective view of the resultant actuator arm assembly 200. As shown, the arm-joining portion 208 integrally joins the first actuator arm portion 204 to the second actuator arm portion 206. It should be noted that the embodiment shown in FIG. 8 shows but one example of a arm-joining portion 208 that integrally joins the first and second actuator arm portions 204, 206 and that other structures are possible, as those of skill in this art may recognize. The coil portion (not shown in FIG. 8, see FIG. 11) of the VCM may thereafter be coupled to the actuator arm assembly 200 by means of an adhesive or by a plastic overmolding process, for example.

The actuator arm assembly 200 may be stamped in such a manner as to create a first surface 224 in the first actuator arm portion 204 that defines the first through bore 205 and to create a second surface 226 in the second actuator arm portion 206 that defines a second through bore 207. As shown, the first and second surfaces 224, 226 are configured such that the first through bore 205 is aligned with the second through bore 207 and the first and second surfaces 224, 226 are also aligned with one another. According to an embodiment of the present invention, the actuator arm assembly 200 may (but need not) be fitted with a collar 228 that is configured to fit within the first and second through bores 205, 227 to further stiffen the actuator arm assembly 200 and to enable the head stack assembly incorporating the present actuator arm assembly 200 to pivot over the recording surface(s) of the disk(s) of the disk drive (see FIG. 11). As shown, the collar 228 may be generally cylindrical in shape and may define a first lip surface 230, a second lip surface 232, a first collar surface 234 extending between the first lip surface 230 and a first free end of the collar 228, a second collar surface 236 extending between the first and second lip surfaces 230, 232 and a third collar surface 238 extending between the second lip surface 232 and a second free end of the collar 228. The lip surfaces 232, 234 are perpendicular to the collar surfaces 234, 236 and 238. The collar 228 also defines a smooth internal surface 240.

Figure 10:
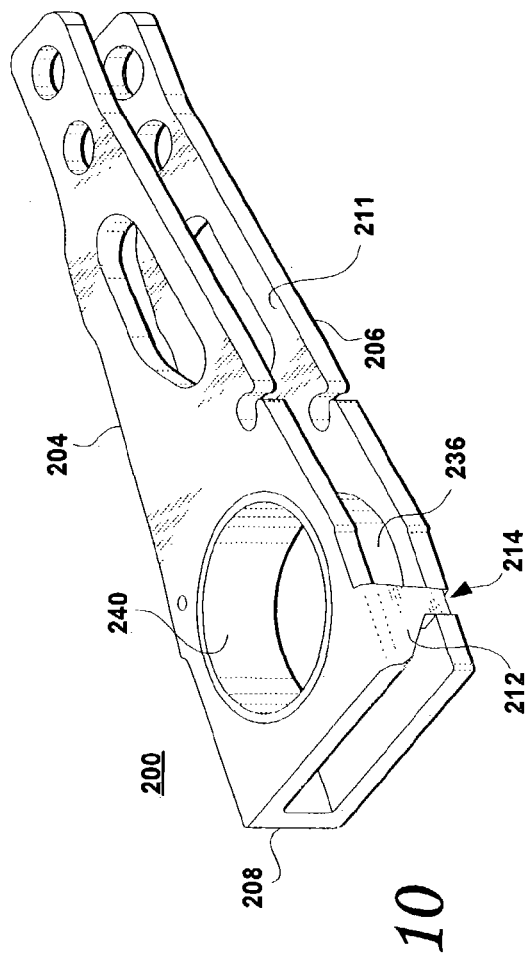
FIG. 10 is a side perspective view of a stamped actuator arm assembly fitted with a collar, according to an embodiment of the present invention.

FIG. 10 is a detail view of the actuator arm assembly 200, and illustrates the manner in which the collar 228 may be fitted thereto. To fit the collar 228 to the actuator arm assembly 200 as shown in FIG. 10, the collar 228 is advanced through the second through bore 207 and through the first through bore 205 of the first and second actuator arm portions 204, 206 until the first lip 230 of the collar 228 abuts the major surface 209 (see FIGS. 4–7) of the first actuator arm portion 204 and the second lip 232 abuts the underside of the second actuator arm portion 206. In this manner, the first collar surface 234 is fitted against the first surface 224 of the first actuator arm portion 204 and a portion of the second collar surface 236 is fitted against the second surface 226 of the second actuator arm portion 206. The remaining portion of the second collar surface 236 extends between the major surfaces 209, 211 of the first and second arm portions 204, 206. The collar 228 may be secured to the actuator arm assembly 200 by means of, for example, laser welding, adhesive and/or swaging. The collar 228, the arm-joining portion 208 and the first and second latch portions 212, 214 of the actuator arm assembly 200 serve to, among other functions, to further stiffen the assembly 200 and to eliminate or reduce the effects of unwanted resonance modes (e.g., to push unwanted resonance modes to higher and less performance affecting frequencies).

Figure 11:
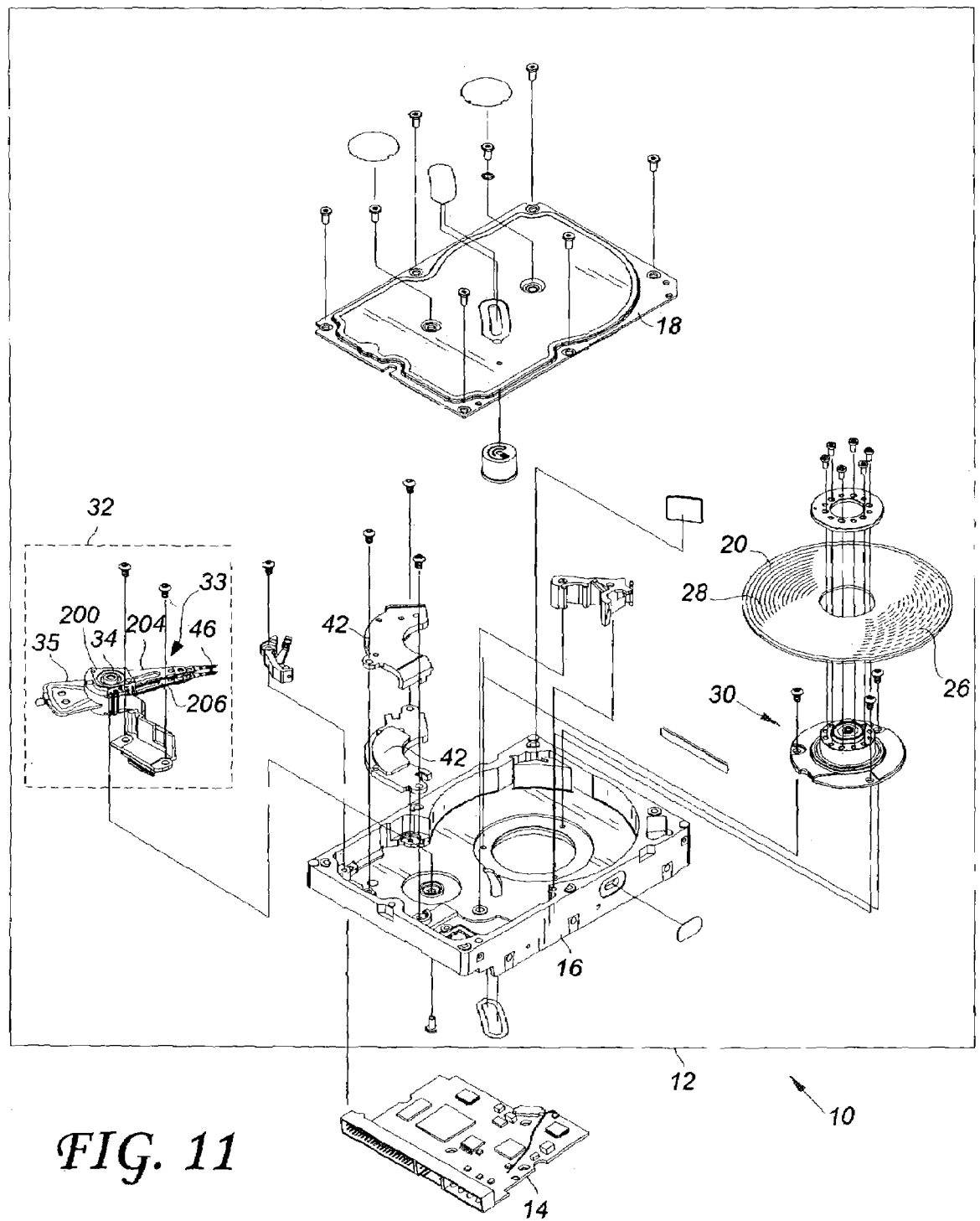
FIG. 11 is an exploded view of a disk drive according to an embodiment of the present invention.

FIG. 11 is an exploded perspective view of a disk drive 10 incorporating aspects of embodiments of the present invention. As shown, the disk drive 10 includes a HDA 12 and a PCBA 14. The HDA 12 includes a disk drive base 16 and a cover 18 that collectively house one or more magnetic disks 20. The magnetic disk 20 contains a plurality of tracks for storing data. The magnetic disk 20 may be two-sided, and thus for example, the magnetic disk 20 is shown having tracks 28 on an upper facing side and tracks 26 (shown in phantom lines) on a lower facing side. The head disk assembly 12 further includes a spindle motor 30 for rotating the magnetic disk 20. The head disk assembly 12 further includes a HSA 32. The head stack assembly 32 includes an actuator arm assembly 200, according to an embodiment of the present invention.

The actuator arm assembly 200 includes a pivot-bearing cartridge 34 engaged within the smooth internal surface 240 of the collar 228 for facilitating the rotation of the actuator arm assembly 200 between limited positions. A coil portion 35 may be coupled to the actuator arm assembly 200. The coil portion 35 (which may be over-molded to the actuator arm assembly 200, for example) extends from the actuator arm assembly 200 to interact with a pair of permanent magnets 42 to form a VCM for pivoting the HSA 32. A head gimbal assembly may be attached to the first actuator arm portion 204 and/or to the second actuator arm portion 206. Each head gimbal assembly includes a head (the uppermost one being denoted 46) for reading and writing data to and from a respective recording surface of the disk 20. In the case wherein only one head gimbal assembly is required (i.e., when the disk 20 only has one recording surface), a compensating weight equivalent to the weight of the missing head gimbal assembly may be attached to the actuator arm portion from which the head gimbal assembly is missing, to preserve the balance of the HSA 32.

The embodiments described and shown herein are illustrative and are not intended to limit the scope of the present invention. Those of skill in this art may recognize that modifications of the described embodiments are possible.

What is claimed is:

1. An actuator arm assembly for a disk drive, the actuator arm assembly being stamped from a single flat sheet of material and comprising:
    a first actuator arm portion defining a voice coil motor (VCM) supporting end, a head gimbal assembly (HGA) supporting end, a first latch portion, and a long axis extending from the VCM supporting end to the HGA supporting end;
    a second actuator arm portion defining a second latch portion configured to latch with the first latch portion;
    an actuator arm-joining portion joining the first actuator arm portion to the second actuator arm portion, the first actuator arm portion, the second actuator arm portion and the actuator arm joining portion being a single part made from the single flat sheet of material, rather than an assembly of sub-parts, and
    a flex cable coupled to the first actuator arm portion and to the second actuator arm portion;
    wherein the actuator arm-joining portion includes a fold along a fold line that is substantially parallel to the long axis.

2. The actuator arm assembly of claim 1, wherein the actuator arm assembly is configured to pivot about a pivot axis and wherein the actuator arm-joining portion is configured to bend into an orientation that is substantially parallel to the pivot axis.

3. The actuator arm assembly of claim 1, wherein the actuator arm assembly is configured to pivot about a pivot axis and wherein the first latch portion is configured to bend into an orientation that is substantially parallel to the pivot axis.

4. The actuator arm assembly of claim 1, wherein the actuator arm assembly is configured to pivot about a pivot axis and wherein both the actuator arm-joining portion and the first latch portion are configured to bend into orientations that are substantially parallel to the pivot axis.

5. The actuator arm assembly of claim 1, wherein the first actuator arm portion includes a first surface defined by a thickness and a length of the first actuator arm portion and wherein the second actuator arm portion includes a second surface defined by a thickness and a length of the second actuator arm portion and wherein prior to bending, the first surface faces and is parallel to the second surface.

6. The actuator arm assembly of claim 1, wherein the first actuator arm portion defines a first surface that defines a first through bore, the second actuator arm portion defines a second surface that defines a second through bore that is configured to align with the first through bore.

7. The actuator arm assembly of claim 1, wherein the actuator arm-joining portion and the first latch portion are configured to bend such that a major surface of the first actuator arm portion faces and is substantially parallel to a major surface of the second actuator arm portion.

8. A head stack assembly for a disk drive, the head stack assembly comprising:
    an actuator arm assembly stamped from a single flat sheet of material and comprising:
        a first actuator arm portion defining a voice coil motor (VCM) supporting end, a head gimbal assembly (HGA) supporting end, a first latch portion, and a long axis extending from the VCM supporting end to the HGA supporting end;
        a second actuator arm portion defining a second latch portion configured to latch with the first latch portion;
        an actuator arm-joining portion joining the first actuator arm portion to the second actuator arm portion, the first actuator arm portion, the second actuator arm portion and the actuator arm joining portion being a single part made from the single flat sheet of material, rather than an assembly of sub-parts;
    a first head gimbal assembly coupled to the actuator arm assembly, and
    a flex cable coupled to the first actuator arm portion, to the second actuator arm portion and to the first head gimbal assembly;
    wherein the actuator arm-joining portion includes a fold along a fold line that is substantially parallel to the long axis.

9. The head stack assembly of claim 8, further including a second head gimbal assembly coupled to the second actuator arm portion and to the flex cable.

10. The head stack assembly of claim 8, wherein the actuator arm assembly is configured to pivot about a pivot axis and wherein the actuator arm-joining portion is configured to bend into an orientation that is substantially parallel to the pivot axis.

11. The head stack assembly of claim 8, wherein the actuator arm assembly is configured to pivot about a pivot axis and wherein the first latch portion is configured to bend into an orientation that is substantially parallel to the pivot axis.

12. The head stack assembly of claim 8, wherein the actuator arm assembly is configured to pivot about a pivot axis and wherein both the actuator arm-joining portion and the first latch portion are configured to bend into orientations that are substantially parallel to the pivot axis.

13. The head stack assembly of claim 8, wherein the first actuator arm portion includes a first surface defined by a thickness and a length of the first actuator arm portion and wherein the second actuator arm portion includes a second surface defined by a thickness and a length of the second actuator arm portion and wherein prior to bending, the first surface faces and is parallel to the second surface.

14. The head stack assembly of claim 8, wherein the first actuator arm portion defines a first surface that defines a first through bore, the second actuator arm portion defines a second surface that defines a second through bore that is configured to align with the first through bore.

15. A disk drive, comprising:
    a disk;
    a head stack assembly for reading and writing to the disk, the head stack assembly comprising:

an actuator arm assembly stamped from a single flat sheet of material and comprising:

a first actuator arm portion defining a voice coil motor (VCM) supporting end, a head gimbal assembly (HGA) supporting end and a first latch portion, and a long axis extending from the VCM supporting end to the HGA supporting end;

a second actuator arm portion defining a second latch portion configured to latch with the first latch portion;

an actuator arm-joining portion joining the first actuator arm portion to the second actuator arm portion, the first actuator arm portion, the second actuator arm portion and the actuator arm joining portion being a single part made from the single flat sheet of material, rather than an assembly of sub-parts;

a first head gimbal assembly coupled to the actuator arm assembly, and a flex cable coupled to the first actuator arm portion, to the second actuator arm portion and to the first head gimbal assembly;

wherein the actuator arm-joining portion includes a fold along a fold line that is substantially parallel to the long axis.

16. The disk drive of claim 15, further including a second head gimbal assembly coupled to the second actuator arm portion and to the flex cable.

17. The disk drive of claim 15, wherein the actuator arm assembly is configured to pivot about a pivot axis and wherein the actuator arm-joining portion is configured to bend into an orientation that is substantially parallel to the pivot axis.

18. The disk drive of claim 15, wherein the actuator arm assembly is configured to pivot about a pivot axis and wherein the first latch portion is configured to bend into an orientation that is substantially parallel to the pivot axis.

19. The disk drive of claim 15, wherein the actuator arm assembly is configured to pivot about a pivot axis and wherein both the actuator arm-joining portion and the first latch portion are configured to bend into orientations that are substantially parallel to the pivot axis.

20. The disk drive of claim 15, wherein the first actuator arm portion includes a first surface defined by a thickness and a length of the first actuator arm portion and wherein the second actuator arm portion includes a second surface defined by a thickness and a length of the second actuator arm portion and wherein prior to bending, the first surface faces and is parallel to the second surface.

21. The disk drive of claim 15, wherein the first actuator arm portion defines a first surface that defines a first through bore, the second actuator arm portion defines a second surface that defines a second through bore that is configured to align with the first through bore.

22. A method of making an actuator arm assembly for a disk drive, comprising the steps of:

providing a flat sheet of material;

stamping the actuator arm assembly from the provided sheet of material such that the stamped arm assembly includes:

a first actuator arm portion defining a voice coil motor (VCM) supporting end, a head gimbal assembly (HGA) supporting end, a first latch portion, and a long axis extending from the VCM supporting end to the HGA supporting end;

a second actuator arm portion defining a second latch portion configured to latch with the first latch portion, and an actuator arm-joining portion joining the first actuator arm portion to the second actuator arm portion, the first actuator arm portion, the second actuator arm portion and the actuator arm joining portion being a single part made from the single flat sheet of material, rather than an assembly of sub-parts;

folding the actuator arm-joining portion along a fold line that is substantially parallel to the long axis, and providing a flex cable and coupling the flex cable to the first and second actuator arm portions.

23. The method of claim 22, further including a step of bending the actuator arm-joining portion such that a major surface of the first actuator arm portion faces and is substantially parallel to a major surface of the second actuator arm portion.

24. The method of claim 22, further including a step of bending the first latch portion such that the first latch portion latches with the second latch portion.

25. The method of claim 22, wherein the stamping step creates a first through bore in the first actuator arm portion and a second through bore in the second actuator arm portion.

26. The method of claim 25, wherein after the bending step, the first through bore is configured to align with the second through bore and wherein the method further includes a step of fitting a collar within the first and second through bores to stiffen the actuator arm assembly.

\* \* \* \* \*